US005553155A

United States Patent [19]

Kuhns et al.

[11] Patent Number: 5,553,155

[45] Date of Patent: Sep. 3, 1996

[54] LOW COST METHOD EMPLOYING TIME SLOTS FOR THWARTING FRAUD IN THE PERIODIC ISSUANCE OF FOOD STAMPS, UNEMPLOYMENT BENEFITS OR OTHER GOVERNMENTAL HUMAN SERVICES

[76] Inventors: Roger J. Kuhns, Tower Rd., Lincoln, Mass. 01773; Robert L. Nathans, 36 Stag Dr., Billerica, Mass. 01821

[21] Appl. No.: 850,350

[22] Filed: Mar. 11, 1992

[51] Int. Cl.[6] .......... G06K 9/00

[52] U.S. Cl. .......... 382/115; 340/825.31

[58] Field of Search .......... 382/2, 115, 116; 340/825.31, 825.34; 235/377, 382; 364/409

[56] References Cited

U.S. PATENT DOCUMENTS

| | | | |
|---|---|---|---|
| 4,870,400 | 9/1989 | Downs et al. | 340/825.34 |
| 5,056,141 | 10/1991 | Dyke | 340/825.34 |
| 5,083,122 | 1/1992 | Clark | 340/825.31 |
| 5,224,173 | 6/1993 | Kuhns et al. | 382/2 |

*Primary Examiner*—Leo Boudreau
*Assistant Examiner*—Andrew W. Johns
*Attorney, Agent, or Firm*—Iandiorio & Teska

[57] ABSTRACT

Upon monthly revalidation of a benefit, the client's pin is read off of the client's benefit card and a PC produces a time slot assigned to the client who receives a food benefit allocation for the month only if the current date and time of day is within his assigned time slot. Since the assigned time slot is only 1–2 hours each month, and since the card holder stands in line, he simply doesn't have time to collect two food benefit allocations from two separated issue stations. He can't get a second food benefit card with a different time slot because the assigned time slot is tied to his unchanging biometric characteristics. However, since the time slots at each issue station are synchronized, he can report to any issue station for convenience. Transfer of a second fraudulently obtained card to an accomplice is thwarted by ink jet printing the applicant's facial image on the benefit card when issued, or using the pin to display his facial image on a CRT.

34 Claims, 2 Drawing Sheets

LOW COST METHOD EMPLOYING TIME SLOTS FOR THWARTING FRAUD IN THE PERIODIC ISSUANCE OF FOOD STAMPS, UNEMPLOYMENT BENEFITS OR OTHER GOVERNMENTAL HUMAN SERVICES

BACKGROUND OF THE INVENTION

The present invention relates to the field of access control and more particularly to access control to prevent fraud in dispensing periodically issued governmental benefits. Importantly, the invention is fully compatable with ordinary debit card telephones already in widespread use for drawing down a credit allocated to a telephone card holder.

Government benefits are periodically dispensed at a plurality of benefit issue stations to citizens who are in need. Examples of such periodically dispensed benefits are food stamps and unemployment benefits. As explained in detail in our copending patent application Ser. No. 07/783,867 filed Oct. 29, 1991, now U.S. Pat. No. 5,224,173, a substantial number of people cheat the taxpayers out of enormous sums of money. In the food stamp program alone, currently distributing food stamps to nearly twenty-five million Americans, we estimate the loss to be between one and two billion dollars per year. The costs of the program are expected to top $22 billion dollars in 1992.

A cheater, Mr. Double Dipper, cheats the system by double dipping, that is, obtaining two or more duly issued social security cards and thus two or more social security numbers. Mr. Double Dipper can obtain the birth certificates and other identification documents of people he knows and use the names and addresses of these people to obtain the unlawfully issued social security cards. Another method is to forge the birth certificates and other documents utilizing a fictitious name but using a particular address of an individual who will vouch for the fact that the fictitious person resides at the particular address. The second duly issued card is then used to obtain a second food stamp card and other government benefits.

In the aforesaid patent application, we teach various techniques for stopping this cheating which employ refined biometric signatures such as fingerprints or voiceprints of those enrolled in the program. Once a person is enrolled in the data processor to receive the government benefit, his fingerprint for example, is recorded therein. When he goes to obtain a second social security and/or food stamp car in the attempt to double dip, his fingerprint is again digitized and is machine matched with his fingerprint already in the data processor, and a definitive positive match stops issuance of a second card. Since the data bank is large, we also teach the use of a coarse biometric index indicative of height, weight, sex and other physical characteristics to greatly reduce the number of refined biometric signatures to be scanned to detect a definitive match indicative of double dipping. Final definitive rejection of an applicant calls for human matching of live facial images of applicants with facial images fetched from a data processor.

While the aforesaid technique is believed to be effective, it would be desirable to provide an alternative method of attaining the aforesaid goals without matching refined biometric signatures in order to save certain labor costs involved in carrying out this method. Also, we wish to issue to each enrollee an ordinary inexpensive magnetic stripe card to enable the enrollee to obtain for example, food stamps, periodically on a monthly or biweekly basis, and at the same time employ this magnetic stripe card to prevent double dipping or other fraud in a simple and inexpensive manner.

SUMMARY OF PREFERRED EMBODIMENTS OF THE INVENTION

Currently, the double dipper uses one food benefit card at a first issue station to get food stamps and uses the second duly issued, but unlawful, card at a second issue station to obtain a second unlawful allocation of food stamps. Upon issuance of the food stamp card, the data processor creates a biometric index, one of twenty-four available indexes, which is a composite of the applicant's sex, age, height and weight, and assigns him a particular one of twenty-four periodically recurring time slot periods related to the particular assigned biometric index of the enrollee. The applicant being enrolled (the enrollee), is given an ordinary magnetic stripe card with a human services number or pin recorded on the stripe. The card is imprinted to inform him when he must be physically present at an issue station to obtain food stamps, or food stamp revalidated electronic credit for later debiting, in accordance with his assigned time slot period, eg. the first Monday morning of the month between 9–10 AM. This is the only time during the month when the card holder can receive the food allocation benefit.

Once each month, during revalidation, the pin on the card is read by an ordinary magnetic stripe card reader and the time slot assigned to the particular pin is retrieved from the issue station data processor store. Only if the current date and time of day is within the time slot period assigned, food stamps are given him or his account is automatically credited with the monthly allotment if food benefit debit cards are in use rather than stamps. Even though he can get two different food stamp (benefit) cards by double dipping, he is thus forced to use them within the same periodically recurring time slot period of only one hour on one assigned day during each month for revalidation. A double dipper with two cards can be readily spotted if he tries to get through the line twice to use the second illicit card, and he simply doesn't have enough time to get to a second issue station within the allocated time slot to get a second food allotment with the second card. We thus take advantage of the fact that he can't be in two places at once.

Importantly, as the time slots are synchronized for all issue stations, the enrollee can conveniently report monthly during his assigned time slot to any issue station in the protected area. This could be of importance to a taxi driver for example.

Optionally, the issued benefit card may be ink jet printed with the facial image of the enrollee to prevent transfer by a double dipper of a second unlawfully issued card to an accomplice who could use the card during the same assigned time slot at the same or a different issue station. Optionally, the facial image can be scrambled in one of many thousands of scramble modes to prevent use of the pin on the second card to make a counterfeit card with the facial image of a phony bearer printed on the card. Another way we stop this fraud is to use the pin recorded upon the benefit card to display the facial image of the original enrollee upon a CRT display screen. The card is no longer transferrable to an accomplice because the live face of the accomplice won't match the facial image on the CRT screen.

While the presence of a guard, and/or lack of time, will deter Mr. Double Dipper from taking two food stamp allocations at the same issue station within the one hour time slot, optionally, facial images may be recorded of those receiving the stamps and rows and columns of facial images may be ink jet printed and viewed off line to identify a double dipper attempting to use two cards to obtain two allocations by going through the line twice. This facilitates the arrest of such person when he appears during the following month. Since he will necessarily be in possession of two cards that are needed to double dip, this is powerful evidence of fraud, along with the printing of his image twice. When the card is later used while shopping for food, the ordinary inexpensive magnetic stripe card is inserted into a debit card type telephone reader at each checkout counter, or at a single central customer service counter, and the monthly food benefit credit allocation is debited at the central data processor just like a debit card telephone account.

BRIEF DESCRIPTION OF THE DRAWINGS

Other objects, features and advantages of the invention will become apparent upon study of the following description, taken in conjunction with the drawings in which.

DETAILED DESCRIPTION OF PREFERRED EMBODIMENTS OF THE INVENTION

The method of the invention can be most advantageously used to issue a consolidated human services or welfare card bearing a consolidated welfare number (pin) assigned to a client beneficiary or enrollee enrolled in the data base. The single card can then be used for periodic weekly, bi-weekly or monthly revalidation of the clients right to receive one or more government benefits such as food stamp allocations, unemployment compensation payments, relief, medical payment or rent or clothing vouchers, or all combined. The following description will be directed at the periodic monthly crediting of an enrollees food benefit (stamp) card which must be presented at an issue station during an assigned day, and during an assigned time period on that day, in order to receive the food benefit credit. The method utilizes ordinary personal computers (PCs) at the benefit issue stations and ordinary inexpensive magnetic stripe cards. This is in contrast to the relatively costly IC or smart cards now mainly used in Europe as debit cards.

Figure 1:
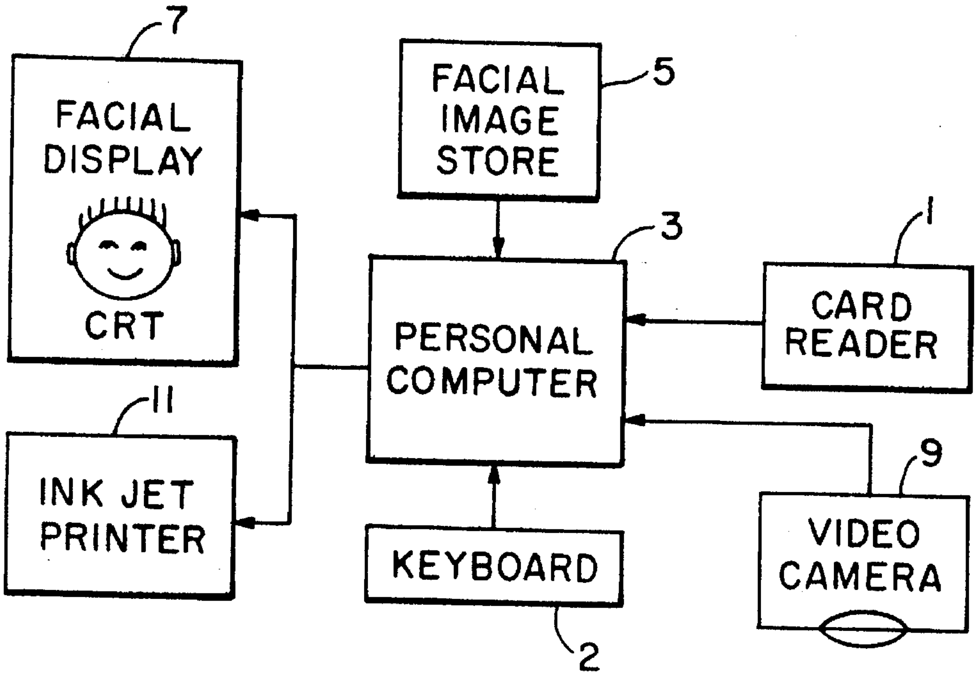
FIG. 1 schematically indicates various electronic devices used in conjunction with various options to be described.

The first step involves generating a particular biometric index for each enrollee when the card is being issued. Keyboard 2 in FIG. 1, is used by the issue station clerk to key in biometric data including a plurality of biometric traits such as the enrollee's sex, age, eye color, height and weight, along with his name, address, etc. This data is common to existing drivers licenses, taxi operator's cards, employee and school IDs etc., and can be easily transferred form such documents, if verified as accurate. The PC software then assigns a personal identification number (pin) to the enrollee along with one of twenty-four biometric indexes related to, or associated with, the keyed in biometric data. Exemplary categories for producing the biometric index could be male/female (two categories); under 25 year of age, between 25 and 50 years of age and over 50 years of age (three categories); a weight over/under the median weight for males of 170, (two categories); a height of over/under the median height of males 5'–7"(two categories). This gives us twenty-four different possible biometric indexes (2×3×2×2), having values of between one and twenty-four.

The assigned pin is thereafter recorded upon the magnetic stripe on an ordinary inexpensive card and the card is issued to the enrollee. This procedure can be similar to the issuance of an automatic teller machine (ATM) banking card. For each enrollee, a register in the PC software contains the assigned pin, the biometric index derived from the keyed in biometric catagories, and the particular recurring time slot period of each enrollee which is related to the value of the enrollee's biometric index. For example, a short, light weight female under the age of twenty-five could be assigned a biometric index of #1 whereas a tall, heavy, male over the age of fifty could be assigned a biometric index of #24. If the enrollee has a biometric index of #1, a look-up table assigns a periodic time slot of #1 which requires her to be physically present at an issue station between nine and ten o'clock AM on the first Monday of each month. On the other hand, time slot #24 could be assigned to an enrollee having a biometric index of #24, and such time slot could be to report to an issue station on the last Friday of the month between say two and four o'clock in the afternoon, and so forth for intermediate time slot periods assigned to those enrollees with intermediate biometric indexes. Each particular time slot can thus be arbitrarily related to and determined or controlled by a particular biometric index. Thus, each biometric index is converted by the look-up table into time slot data in accordance with an under the control of the index.

The specific software (or hardware) programming steps to carry out the method of the invention, will be readily apparent to the skilled computer programmer. When an enrollee reports to receive his benefit on the correct assigned day and during the assigned time period, he is thus reporting within his assigned periodic time slot within each month. The enrollee's card is inserted into an ordinary magnetic stripe card reader 1 which retrieves the pin which is used to point to the enrollee's register having the assigned biometric index therein. The biometric index can then addresses a look up table to produce the related assigned time slot, or the time slot itself can be previously produced and prerecorded in the enrollee's register. The program then issues the benefit to the card holder only if the current time and day is within the particular time slot assigned to the card holder. That is, the card holder must be physically present at an issue station on the assigned date and during the assigned time period. If such is the case, the resulting positive benefit issue signal can automatically credit the card holder's account for the monthly cash value benefit, where food stamps have been replaced by food benefit debit cards. Otherwise, the benefit is refused.

All, or at least a large group of issue stations within a given protected area, should have synchronized programs so that all issue stations are programmed to issue benefits only to persons having the same biometric index and who are physically present at an issue station during any particular time and date. Recall that our objective is to stop Mr. Double Dipper from getting two food stamp benefit cards and using them to get two food benefit allocations during each month. The method of our invention prevents him from using the second card simply because he will not have enough time to wait in line to get his benefit at a first issue station and rush to an adjacent station and stand in line at the second station to get his second benefit. Our calculations indicate that the assigned time period can be one hour or even less. Once this time period has expired, the guard closes the door and a card holder can no longer get in the benefit line. For "tight" time periods of one hour or less, the enrollees are instructed to arrive a half hour earlier than the beginning of the time period. The time period can always be shortened ("tightened") by providing more issue station clerks and more lines. However, the time slot period should not exceed two hours as the double dipper may be able to get to a closely adjacent issue station in time to receive a second benefit. Although time slots should be synchronized at adjacent stations, the time slots need not have the same duration.

Importantly, as the time slots are synchronized, the enrollee can conveniently report monthly during his assigned time slot to any issue station in the protected area. This could be of importance to a taxi driver for example.

OPTIONAL FACIAL IMAGE OF ENROLLEE THWARTS CARD TRANSFER

Mr. Double Dipper will quickly learn that the second food stamp card that he unlawfully obtained is not usable by him due to the assigned time slot feature of the invention described above. However, he may give the second card to an accomplice who will attempt to use it during the same time slot assigned to the first card, which is also the assigned time slot of the second card as the biometric indexes of Mr. Double Dipper will be the same. This forces the double dipper to go to the trouble of getting an accomplice who has similar biometric characteristics as the double dipper; otherwise he will stand out in the crowd and can be visually spotted by the issue station clerks as being in the wrong biometric category for the proper current time slot.

In any event, such effective fraudulent transfer of the second illicit card to an accomplice can be stopped by employing the pin to retrieve the stored facial image of the person to whom the card was issued from a facial image store in the data processor for display by a CRT and visual comparison by the issue station clerk with the live facial image of the person seeking the benefit. Devices for performing this function for access control are currently on the market and are described in greater detail below. Fraudulent transfer can also be stopped by ink jet printing the facial image of each person who applies for a card right on his card. Thus, when Mr. Double Dipper gets his second card, his facial image is printed on the second card. Now, when the accomplice tries to use the second card, the facial image of the double dipper on the card won't match the live face of the accomplice presenting the card. The clerk easily observes the facial mismatch and the benefit is refused. The accomplice can be arrested with the card in his possession bearing the facial image of the double dipper. This is powerful evidence if the enforcement branch of the issuing authority wishes to criminally prosecute. Of course the wrong facial image on the second card acts as a deterrent to attempting to use the second card in the first place.

This facial image recordation on the card is still subject to a sophisticated attack by a clever person as follows. The pin is read off of the second card and recorded on a third card with standard magnetic stripe read/write devices. The facial image of the accomplice is now recorded on the third card with a PC with appropriate image processing software, having a video camera, frame grabber, and ink jet printer attached. Now, when the third card is used to obtain benefits at the issue station, the facial image on the third card will match the live facial image of the accomplice presenting the card to the issue station clerk. This fraud may be stopped by recording a partially scrambled facial image on the card when issued in accordance with one of many thousands of scramble modes. When the card is presented to the issue station clerk, the "Scramble-Gard" verifier will descramble the partially scrambled facial image. However, the card is counterfeit proof since a counterfeiter cannot know how to scramble the pixels of the facial image recorded on the card so that it becomes descrambled. If a facial image is ink jet printed without scrambling, the verifier will scramble it to display an invalid card. For further details, including a computer program which can be readily executed by PC 3, see U.S. Pat. No. 4,972,476 issued to Nathans.

While the presence of a guard at the issue station will deter Mr. Double Dipper from attempting to use two cards within the short or "narrow" one hour time slot, a bold person may attempt to go through the line twice to use both cards. If the guard recognizes him doing this, he can be arrested and searched. Possession of two benefit cards is powerful evidence of double dipping fraud. If this problem warrants further countermeasures, an ink jet printout of rows and columns of facial images of all applicants receiving the benefit during a particular time slot can be produced by PC 3 and the facial images can be examined off line to detect the same person getting two food stamp allocations during the same time slot.

The equipment used to carry out the method of the invention is an ordinary person computer (PC) 3 of FIG. 1, having an ordinary magnetic strip or bar code card reader 1 attached.

Figure 2:
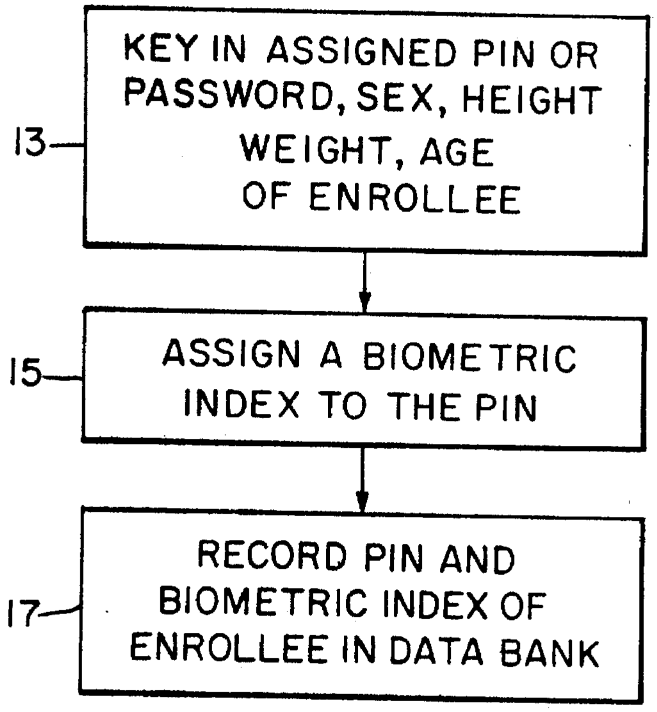
FIG. 2 illustrates a flow chart indicating data processor steps performed when the card is issued.

As shown in FIG. 2, when the applicant applies for his food benefit card, the clerk keys in data via keyboard 2 used to produce an assigned pin, as is done for ATM cards. See block 13 of FIG. 2. The pin can be pre-assigned or the applicant's name and a password made up by the applicant can be used to encrypt the pin. The computer program then assigns one out of twenty-four biometric indexes based on the keyed in biometric characteristics as previously explained (block 15). The pin of the applicant is now recorded along with his biometric index in the data bank of the PC 3 which could be a hard disk (block 17).

Figure 3:
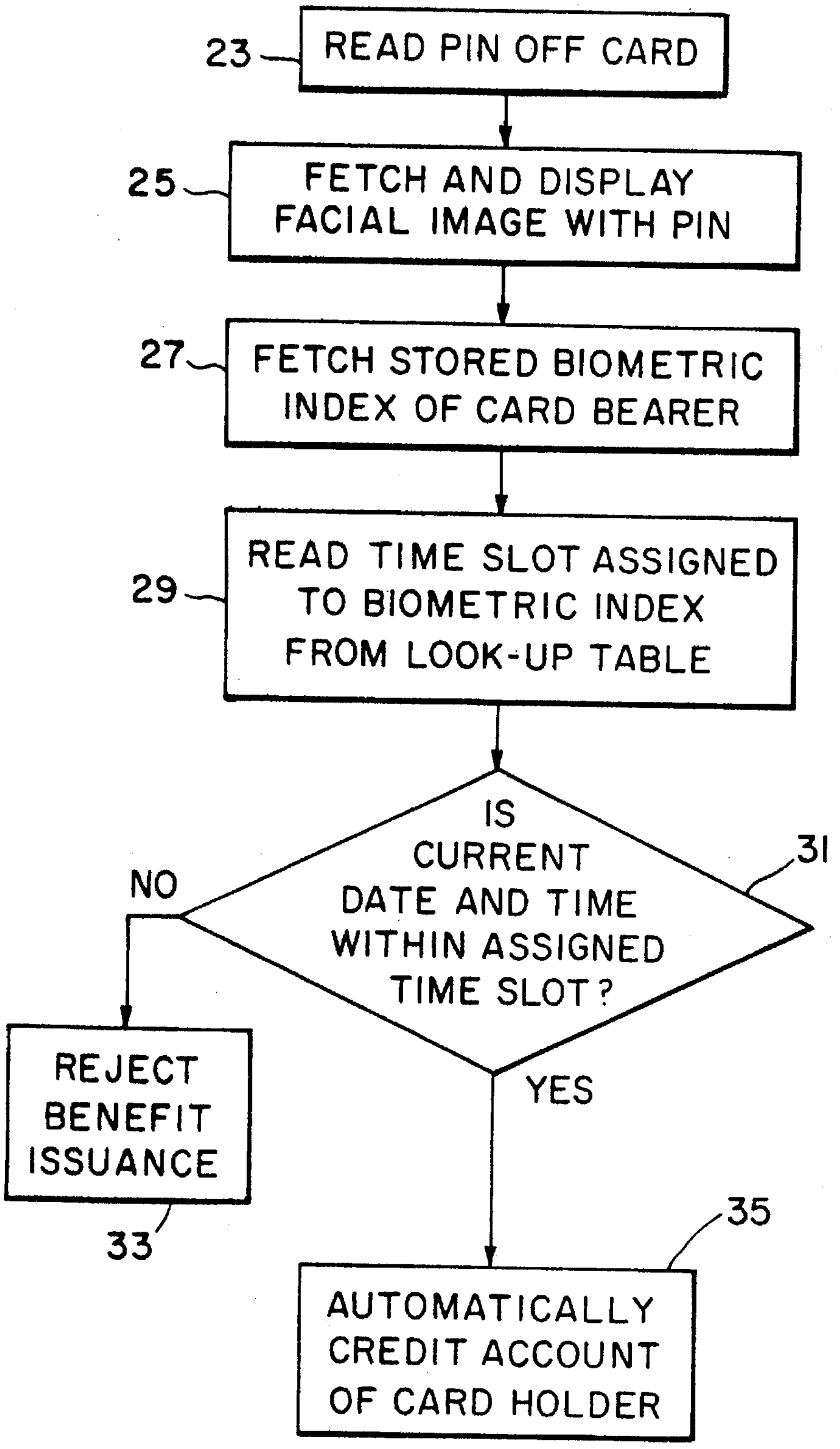
FIG. 3 illustrates a flow chart indicating steps taken during periodic monthly revalidation of a food benefit.

When the card holder later applies each month for his revalidated monthly food stamp allocation, his pin is read off of the magnetic stripe or bar code on his card (block 23, FIG. 3) by card reader 1, and is used to retrieve his biometric index (block 27) stored in the PC data bank. The retrieved biometric index then addresses a look up table (LUT) which reads and outputs the time slot related or assigned to the biometric index the the card bearer (block 29). The program now determines whether the current date and time of day is within the assigned time slot. If it is, the account of the cardholder is automatically credited with the appropriate amount for the coming month (see 31,35). Alternatively, the lack of a positive benefit signal blocks issuance of the benefit (block 33). Optionally, the card can be confiscated as is done in ATM machines.

Should the aforesaid optional facial image verification procedure be employed to prevent fraudulent second card transfer, the pin could retrieve the stored facial image of the person to whom the card was issued as indicated by block 25 for display by CRT 7 and visual inspection by the issue station clerk. Devices for performing this function for access control are currently on the market. See for example, the facial CRT imaging driver's licensing system being supplied by NBS Imaging Systems, Inc., to the State of California, described in "Advanced Imaging", June 1991, pages 21–23. See also U.S. Pat. No. 4,020,463 issued to Himmel. Alternatively, the aforesaid "Scramble-Gard" system of U.S. Pat. No. 4,972,476 can be used to prevent illicit second card transfer. Both of these approaches would produce the facial image of the person to whom the card was originally issued on CRT display screen 7.

A double dipper with two cards might attempt to get two food stamp benefits for the month by being close to the head of the line at the appointed time and attempt to go through the line twice. While this is not easy to do, since there is little time, and a guard is watching, it may be attempted. If this practise becomes common, a video camera 9, one for each line, may be employed to record the facial images of all applicants. Later, groups of the recorded facial images are examined by a clerk off line to identify the same person in line twice. Facial ink jet printer 11 can print columns of facial images corresponding to lines of applicants applying during the one hour assigned time slot interval. When an applicant is before the clerk, his facial image is recorded by CCD video camera 9 along with his pin. When he appears the following month, he can be arrested with the two cards in his possession.

What if an enrollee is sick or unavoidably detained and hence cannot appear at the assigned time? An alternate time is made available so that the enrollee or a friend or family member can be interviewed by an issue station clerk to perform the benefit revalidation process, provided that the clerk believes the excuse of the client and provided that this does not occur often. An alternate "stand-in" person may be appointed if appropriate. The alternate could then use the card with the same pin if authorized.

Some indication of the extent of the aforesaid fraud may be obtained by using the method of the invention for short periods of one to two months, provided that there is no substantial increase in enrollment taking place just before and during the pilot test period. After this pilot program testing period, the state agency can examine the reduction of benefits revalidated in protected areas where the method is tested.

Numerous variations in the aforesaid embodiments will readily occur to the skilled worker in the art and thus the scope of the invention is to be defined by the terms of the following claims and art recognized equivalents. For example, the biometric index can be only one particular type of biometric characteristic such as weight, if the number of weight categories are increased eg say 121–125 lbs is category one; 126–130 lbs could be catagory two and so forth. It could be practical to put a scale under a rug and weight each applicant monthly and update a stored weight in the enrollee's biometric index register to compensate for minor weight changes. Also, biometric characteristics such as eye color (brown or other) can be added to the four types of biometric characteristics making up the biometric index and described previously, to thus double the number of time slots if desired.

The term "time slot period" generally will include an assigned day in addition to an assigned time period during the day. The term "refined biometric characteristic" includes facial images, voiceprints, body prints or the like which are relatively unique compared to sex, age, eye color, height and weight type categories. While the pin is preferrably read off of the card by a card reader, it could be keyed in by the client as a password. Recordation of data on the card includes writing date, including refined biometric data such as a facial image, into an IC or smart card. Also, "a particular enrollee" includes an authorized friend or family member who is allowed to represent the original enrollee as mentioned above. The data processing means need not be a centralized computer. Upon card issuance, a dedicated micro-processor could receive biometric characteristics data keyed in by the clerk, and use such data to look up a corresponding time slot in a look-up table and record the time slot day and time directly on the card. Later, during monthly revalidation, the clerk could then read the time slot from the card and revalidate the monthly benefit credit.

We claim:

1. Method of utilizing an electronically controlled data processor means to prevent fraud in the issuance of periodically dispensed benefits to enrollees at a plurality of benefit issue stations comprising the steps of:

(a) inputting biometric data indicative of at least one particular type of biometric characteristic of each enrollee into said electronically controlled data processor means;

(b) utilizing the biometric data to assign a particular periodically recurring time slot period, selected from at least several time slot periods, to each enrollee in accordance with and under the control of the biometric data of each enrollee;

(c) detecting the presence of each enrollee at an issue station; and (d) issuing a benefit to each enrollee only if the enrollee reports to an issue station during that periodically recurring time slot period assigned to the enrollee.

2. The method of claim 1 wherein step (b) includes causing the biometric data to address a look-up table.

3. Method of claim 1 wherein said periodically recurring time slot period is no greater than two hours in duration, thus making it difficult for an enrollee to receive two benefit allocations at two adjacent issue stations.

4. Method of claim 3 further including recording facial images of enrollees receiving benefits at a particular issue station and within a particular recurring time slot period and displaying groups of recorded facial images to a human being to enable detection of two facial images of the same person, thereby to further deter fraud.

5. Method of claim 1 including causing all issue stations within a portion of a protected area to issue benefits at particular times only to enrollees having the same assigned periodically recurring time slot period to deter fraud, while at the same time enabling an enrollee to conveniently report to an issue station of his own choosing.

6. Method of claim 1 further including recording facial images of enrollees receiving benefits at a particular issue station and within a particular recurring time slot period and displaying groups of recorded facial images to a human being to enable detection of two facial images of the same person, thereby to further deter fraud.

7. Method of claim 1 wherein said periodically recurring time slot period recurs no more than once a week.

8. Method of utilizing an electronically controlled data processor means to prevent fraud in the issuance of periodically dispensed benefits to enrollees at a plurality of benefit issue stations comprising the steps of:

(a) inputting biometric data indicative of at least one particular type of biometric characteristic of each enrollee into said electronically controlled data processor means;

(b) converting the biometric data of each enrollee into time slot data related to biometric characteristics represented by the biometric data, the time slot data being indicative of one periodically recurring time slot period;

(c) utilizing the time slot data produced in accordance with step (b) to assign a particular periodically recurring time slot period, selected from at least several time slot periods, to each enrollee;

(d) detecting the presence of each enrollee at an issue station; and (e) issuing a benefit to each enrollee only if the enrollee reports to an issue station during that periodically recurring time slot period assigned to the enrollee.

9. The method of claim 8 wherein step (b) includes causing the biometric data to address a look-up table.

10. Method of claim 8 wherein said periodically recurring time slot period is no greater than two hours in duration, thus making it difficult for an enrollee to receive two benefit allocations at two adjacent issue stations.

11. Method of claim 8 including causing all issue stations within a portion of a protected area to issue benefits at particular times only to enrollees having the same assigned periodically recurring time slot period to deter fraud, while at the same time enabling an enrollee to conveniently report to an issue station on his own choosing.

12. Method of claim 8 further including recording facial images of enrollees receiving benefits at a particular issue station and within a particular recurring time slot period and displaying groups of recorded facial images to a human being to enable detection of two facial images of the same person, thereby to further deter fraud.

13. Method of claim 8 wherein said periodically recurring time slot period recurs no more than once a week.

14. Method of utilizing an electronically controlled data processor means to prevent fraud in the issuance of periodically dispensed benefits to enrollees at a plurality of benefit issue stations comprising the steps of:

(a) generating a particular biometric index having a given value for each enrollee which is representitive of several different types of biometric characteristics of the enrollee;

(b) utilizing the particular biometric index of each enrollee to assign a particular one of at least several periodically recurring time slot periods to each enrollee which is based upon and related to the value of the particular biometric index generated in accordance with step (a);

(c) detecting the presence of each enrollee at an issue station; and (d) issuing a benefit to each enrollee only if the enrollee reports to an issue station during that periodically recurring time slot period assigned to the enrollee.

15. The method of claim 14 wherein step (b) includes causing the biometric index to address a look-up table.

16. Method of claim 14 wherein the biometric index is indicative of a plurality of the following types of biometric characteristics, sex, age, height, weight and eye color.

17. Method of claim 14 wherein said periodically recurring time slot period is no greater than two hours in duration, thus making it difficult for an enrollee to receive two benefit allocations at two adjacent issue stations.

18. Method of claim 14 including causing all issue stations within a portion of a protected area issue benefits at particular times only to enrollees having the same assigned periodically recurring time slot period to deter fraud, while at the same time enabling an enrollee to conveniently report to an issue station of his own choosing.

19. Method of claim 14 further including recording facial images of enrollees receiving benefits at a particular issue station and with a particular recurring time slot period and displaying groups of recorded facial images to a human being to enable detection of two facial images of the same person, thereby to further deter fraud.

20. Method of claim 14 wherein said periodically recurring time slot period recurs no more than once a week.

21. Method of utilizing an electronically controlled data processor means to prevent fraud in the issuance of periodically dispensed benefits to enrollees at a plurality of benefit issue stations comprising the steps of:

(a) inputting biometric data having a given value and indicative of at least one particular type of biometric characteristics of each enrollee into said electronically controlled data processor means;

(b) converting the biometric data of each enrollee into time slot data related to the value of the biometric data, the time slot data being indicative of one periodically recurring time slot period;

(c) utilizing the time slot data produce din accordance with step (b) to assign a particular periodically recurring time slot period, selected from at least several time slot periods, to each enrollee;

(d) detecting the current time and current day during which each enrollee reports to an issue station; and (d) thereafter enabling the issuance of a benefit to each enrollee only if the current time and day is within the periodically recurring time slot period assigned to the enrollee.

22. The method of claim 21 wherein step (b) includes causing the biometric data to address a look-up table.

23. Method of claim 21 wherein the biometric data is indicative of a plurality of the following types of biometric characteristics, sex, age, height, weight and eye color.

24. Method of claim 21 said periodically recurring time slot period is not greater than two hours in duration, thus making it difficult for an enrollee to receive two benefit allocations at two adjacent issue stations.

25. Method of claim 21 including causing all issue stations within a portion of a protected area to issue benefits at particular times only to enrollees having the same assigned periodically recurring time slot period to deter fraud, while at the same time enabling an enrollee to conveniently report to an issue station of his own choosing.

26. Method of claim 21 further including recording facial images of enrollees receiving benefits at a particular issue station and within a particular recurring time slot period and displaying groups of recorded facial images to a human being to enable detection of two facial images of the same person, thereby to further deter fraud.

27. Method of claim 21 wherein said periodically recurring time slot period recurs no more than once a week.

28. Method of utilizing an electronically controlled data processor means to prevent fraud in the issuance of periodically dispensed benefits to enrollees at a plurality of benefit issue stations comprising the steps of:

(a) inputting biometric data indicative of at least one particular type of biometric characteristic of each enrollee into said electronically controlled data processor means;

(b) producing a variable index having a value which is a function of the biometric data of each enrollee and utilizing the variable index to assign a time slot period to each enrollee which is determined by the value of the index;

(c) detecting the presence of each enrollee at an issue station; and (d) issuing a benefit to each enrollee only if the enrollee reports to an issue station during that periodically recurring time slot period assigned to the enrollee.

29. The method of claim 28 wherein step (b) includes causing the biometric data to address a look-up table.

30. Method of claim 28 wherein said periodically recurring time slot period is no greater than two hours in duration, thus making it difficult for an enrollee to receive two benefit allocations at two adjacent issue stations.

31. Method of claim 30 further including recording facial images of enrollees receiving benefits at a particular issue station and within a particular recurring time slot period and displaying groups of recorded facial images to a human being to enable detection of two facial images of the same person, thereby to further deter fraud.

32. Method of claim 28 including causing all issue stations within a portion of a protected area to issue benefits at particular times only to enrollees having the same assigned periodically recurring time slot period to deter fraud, while at the same time enabling an enrollee to conveniently report to an issue station of his own choosing.

33. Method of claim 28 further including recording facial images of enrollees receiving benefits at a particular issue station and within a particular recurring time slot period and displaying groups of recorded facial images to a human being to enable detection of two facial images of the same person, thereby to further deter fraud.

34. Method of claim 28 wherein said periodically recurring time slot period recurs no more than once a week.

* * * * *